United States Patent [19]

Valls

[11] Patent Number: 4,968,196
[45] Date of Patent: Nov. 6, 1990

[54] PATTERN WHEEL CUTTING APPARATUS
[75] Inventor: Jose Valls, Charlotte, N.C.
[73] Assignee: Lida, Inc., Charlotte, N.C.
[21] Appl. No.: 373,106
[22] Filed: Jun. 28, 1989
[51] Int. Cl.⁵ ............................................... B23C 1/16
[52] U.S. Cl. .................... 409/164; 51/100 P; 409/221
[58] Field of Search .................. 409/38, 39, 166, 162, 409/164, 165, 167, 168, 198, 221; 51/100 P, 216 H; 76/37, 42

[56] References Cited

U.S. PATENT DOCUMENTS

| | | | |
|---|---|---|---|
| 906,189 | 12/1908 | Boisard | 409/38 |
| 2,261,052 | 10/1941 | Coffin et al. | 409/221 X |
| 2,359,601 | 10/1944 | Andrew et al. | 409/164 |
| 2,407,970 | 9/1946 | Andrew et al. | 409/221 X |
| 2,422,414 | 6/1947 | Hoier | 409/164 |
| 2,592,821 | 4/1952 | Powell | 409/164 X |
| 3,018,699 | 1/1962 | Buffoli | 409/167 |
| 3,680,439 | 8/1972 | Lancaster et al. | 409/221 X |
| 3,859,893 | 1/1975 | Hodgson | 409/38 |
| 3,877,150 | 4/1975 | Hoefler | 409/38 |
| 3,978,767 | 9/1976 | Levin | 409/164 |
| 4,040,313 | 8/1977 | Lustgraaf | 51/100 P |

Primary Examiner—William Briggs
Attorney, Agent, or Firm—Shefte, Pinckney & Sawyer

[57] ABSTRACT

An apparatus for cutting peripheral teeth in a pattern wheel blank for use as a pattern wheel on a textile knitting machine includes a base on which a driven cutting blade is affixed and on which a carriage is reciprocable toward and away from the cutting blade. The pattern wheel blank is mounted on the carriage for movement therewith into and out of cutting engagement with the blade and is incrementally indexable for cutting engagement therewith at plural locations about the pattern wheel blank periphery. Electrical control circuitry enables the extent of each reciprocal movement of the carriage to be selectively varied to either permit or prevent cutting engagement between the pattern wheel blank and the cutting blade at each peripheral location on the pattern wheel blank.

7 Claims, 2 Drawing Sheets

PATTERN WHEEL CUTTING APPARATUS

BACKGROUND OF THE INVENTION

The present invention relates to an apparatus for cutting peripheral teeth in a pattern wheel blank for use as a pattern wheel on a textile knitting machine or the like.

In many conventional textile circular knitting machines, pattern wheels are utilized for controlling the selective raising of the knitting needles of the machine into a stitch-forming position for receiving yarn. In such machines, the knitting needles are formed with one or more operating butts projecting from the stem of the needle. The pattern wheels are positioned about the knitting machine at each knitting station for operational engagement with the needle butts. Each pattern wheel is provided with a plurality of slots, commonly referred to as "cuts", formed in the outer periphery of the wheel at spacings corresponding to the needle gauge of the knitting machine. According to the desired knitting pattern for the knitting machine, selective slots in each pattern wheel are fitted with pins, known as "jacks," for engagement with the butts of corresponding needles of the knitting machine. Thus, the preselected presence and absence of pins in the peripheral slots of the pattern wheel controls the raising and lowering of the knitting needles to establish the knitting pattern of the machine.

While such conventional pattern wheel mechanisms can significantly expand the patterning capabilities of textile circular knitting machines, such pattern wheel mechanisms nevertheless have limitations. For example, it is not possible to expand the pattern wheel size and patterning capability of a conventional pattern wheel mechanism except by substituting a larger pattern wheel. Further, any given pattern wheel is usable with knitting machines of a corresponding needle gauge, so that different pattern wheels are required for knitting machines of differing gauges. Since conventional pattern wheels are not inexpensive, it is generally impractical to maintain a varied inventory of pattern wheels of differing gauges and sizes to provide increased patterning flexibility. Additionally, the initial set-up of pattern wheels with pins in selected peripheral wheel slots is a relatively labor intensive operation and therefore relatively expensive. Finally, the size, shape and mounting requirements of conventional pattern wheel mechanisms make it possible to retrofit such mechanisms on some conventional circular knitting machines.

SUMMARY OF THE INVENTION

It is accordingly an object of the present invention to provide an apparatus by which pattern wheel usable on many if not most conventional textile circular knitting machines and the like may be readily and inexpensively fabricated in substantially any desired size and in conformity with substantially any needle gauge for knitting substantially any desired pattern.

According to the present invention a textile knitting machine pattern wheel is fabricated from a disk-like pattern wheel blank by selectively cutting teeth in the periphery of the blank at spacings circumferentially thereabout. Briefly summarized, the apparatus of the present invention for accomplishing this cutting operation includes a base, a cutting device, and an arrangement for mounting the pattern wheel blank and the cutting device on the base for selective relative cutting movement of one of the pattern wheel blank and the cutting device toward and away from the other to bring the periphery of the pattern wheel blank and the cutting device into and out of cutting engagement and also for selective relative indexing movement of one of the pattern wheel blank and the cutting device circumferentially about the axis of the pattern wheel blank for cutting engagement between the periphery of the pattern wheel blank and the cutting device at plural locations about the periphery of the pattern wheel blank.

In the preferred embodiment, the cutting device is fixedly mounted to the base and includes a driven cutting blade, the pattern wheel blank being supported on a carriage mounted on the base for reciprocating movement toward and away from the cutting blade for movement of the periphery of the pattern wheel blank into and out of cutting engagement with the cutting blade. An indexing arrangement is provided for rotating the pattern wheel blank incrementally relative to the carriage for cutting engagement between the periphery of the pattern wheel blank and the cutting blade at a plurality of locations spaced about the periphery of the pattern wheel blank. Preferably, an indexing gear is mounted on the carriage coaxially with the pattern wheel blank for this purpose. A control arrangement is provided for selectively actuating and deactuating reciprocating movements of the carriage and for selectively varying the extend of movement of the carriage upon each reciprocation to selectively permit and prevent cutting engagement between the pattern wheel blank and the cutting blade at each peripheral location on the pattern wheel blank.

Preferably, the control arrangement includes a reversible drive motor for driving movement of the carriage. A switch arrangement is actuable for initiating cutting movement of the carriage from a resting start position toward the cutting blade, a selector being provided for predetermining the extent of cutting movement of the carriage. Limit switches are provided for reversing movement of the carriage at the completion of the predetermined extend of its cutting movement, for initiating opposite return movement of the carriage away from the cutting blade, and for stopping return movement of the carriage at the resting start position.

DESCRIPTION OF THE PREFERRED EMBODIMENT

Figure 1:
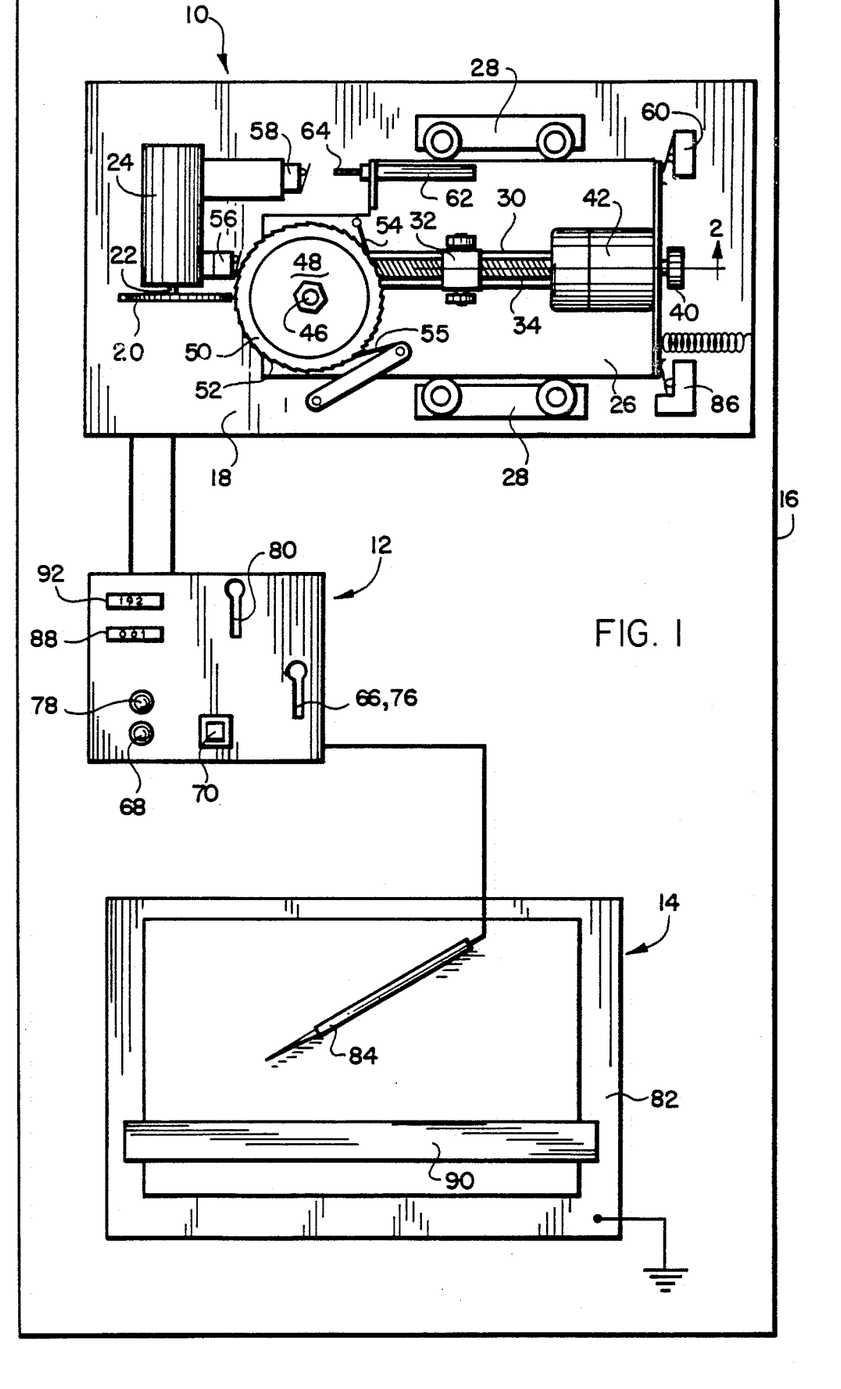
FIG. 1 is a top plan view of a pattern wheel cutting apparatus according to the preferred embodiment of the present invention.

Referring now to the accompanying drawings and initially to FIG. 1, a pattern wheel cutting apparatus according to the preferred embodiment of the present invention is illustrated and basically includes a cutting station, generally indicated at 10, a control panel, generally indicated at 12, and an operator work station, generally indicated at 14. Preferably, the cutting station 10, the control panel 12, and the operator work station 14 will be conveniently positioned adjacent one another on a tabletop or other suitable work surface, generally indicated at 16.

Figure 2:
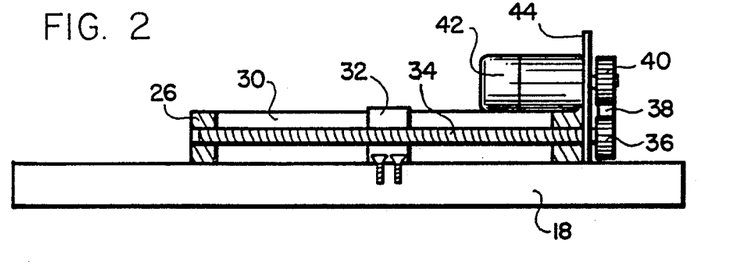
FIG. 2 is a vertical cross-sectional view through the pattern wheel cutting apparatus of FIG. 1 taken along line 2—2 thereof.

The cutting station 10 includes a rectangular base 18 stationarily mounted or otherwise supported on the work surface 16. A cutting wheel 20, preferably in the form of a circular saw blade, is affixed to the drive shaft 22 of an electric drive motor 24 fixed to the base 18 at one end thereof for driven cutting rotation of the cutting wheel 20 about a substantially horizontal axis. A generally rectangular carriage 26 is supported on the base 18 between a pair of bearing assemblies 28 for reciprocal sliding movement of the carriage 26 lengthwise of the base 18 toward and away from the cutting wheel 20. A slot 30 is formed lengthwise through the carriage 26 generally centrally thereof and a screw bearing 32 fixedly mounted to the base 18 extends upwardly through the slot 30. An elongate threaded drive screw 34 extends through the screw bearing 32 in threaded drive engagement therewith and extends outwardly from each opposite side thereof through the extent of the slot 30 with the opposite ends of the drive screw 34 being rotatably journaled in the carriage 26 at the opposite ends of its slot 30. The end of the drive screw 34 extending oppositely from the cutting wheel 20 protrudes outwardly from the carriage 26 and carries a drive sprocket 36 connected through a drive chain 38 with another drive sprocket 40 mounted on the drive shaft of a reversible electric motor 42 mounted by a bracket 44 to the carriage 26 immediately above the drive screw 34, all as best seen in FIG. 2. In this manner, the reversible electric motor 42 is adapted to drive reciprocal sliding movement of the carriage 26 on the base 18 toward and away from the cutting wheel 20.

The extent of reciprocal travel of the carriage 26 leftwardly and rightwardly with respect to the base 18 is determined by a set of three limit switches 56, 58, 60 mounted to the base 18. The fullest extent of reciprocal travel of the carriage 26 is defined by the limit switches 56, 60, the limit switch 60 being mounted at the rightward end of the base 18 for engagement by the carriage 26 at the rightwardmost extent of its reciprocal movement and the limit switch 56 being similarly mounted adjacent the leftward end of the base 18 for engagement with the carriage 26 at the leftwardmost extent of its reciprocal movement. Alternatively, a shorter extent of reciprocal travel of the carriage 26 may be selected by means of a solenoid 62 mounted on the leftward end of the carriage 26 for selective engagement of its reciprocable shaft 64 with the limit switch 58. Specifically, the disposition of the solenoid 62 on the carriage 26 is selected so that, when the solenoid 62 is energized, its shaft 64 projects leftwardly to a sufficient extent to engage the limit switch 58 in advance of engagement of the limit switch 56 by the carriage 26, thereby defining a lesser leftward extent of travel of the carriage 26, while on the other hand, when the solenoid 62 is deenergized, its shaft 64 remains sufficiently retracted so that the carriage 26 contacts the limit switch 56 before the solenoid shaft 64 contacts the limit switch 58. Another limit switch 86 is positioned at the rightward end of the base 18 identically as the limit switch 60 for like engagement by the carriage 26 at the rightwardmost extent of its reciprocal movement for registering the completion of each carriage reciprocation with a counting device, as more fully explained hereinafter.

A shaft 46 is rotatably mounted in upright disposition on the carriage 26 at the end thereof adjacent the cutting wheel 20 essentially coplanar with the radial extent thereof for removably supporting a pattern wheel blank 48 and an indexing gear 50 for integral coaxial rotation with the shaft 46. The pattern wheel blank 48 is preferably a circular disk which may be fabricated of substantially any suitable material capable of being cut by the cutting wheel 20, but preferably is formed of a plastic material for simplicity and economy of manufacture and ease of cutting. The indexing gear 50 has a plurality of teeth 52 formed at equal circumferential spacings about its periphery. a resilient spring retaining lever 54 is affixed to the carriage 26 for engagement with the toothed periphery of the indexing gear 50 to prevent undesired rotation of the gear 50, the shaft 46 and the pattern wheel blank 48. Similarly, a resilient spring indexing lever 56 is fixed to the base 18 for engagement with the toothed periphery of the indexing gear 50 upon each reciprocal return movement of the carriage 26 to rotationally advance the index gear 50 by an increment of one tooth 52 in a clockwise direction, as viewed in FIG. 1, and in turn to rotationally advance the shaft 46 and the pattern wheel blank 48 clockwise by a corresponding circumferential increment. The location of the shaft 46 on the carriage 26 is selected in relation to the maximum extent of carriage travel and in relation to the diameter of the pattern wheel blank 48 so as to bring the periphery of the pattern wheel blank 48 into cutting engagement with the cutting wheel 20 to a predetermined radial depth in the pattern wheel blank 48 when the carriage 26 is moved to the fullest leftward extent of its reciprocal travel as determined by the limit switch 56 but to avoid cutting engagement of the pattern wheel blank 48 with the cutting wheel 20 when the carriage 26 is moved leftwardly through only the partial extent of its reciprocal travel as determined by the limit switch 58. The unitary incremental rotational advancement of the indexing gear 50, the shaft 46, and the pattern wheel blank 48 permits the selective cutting of the pattern wheel blank 48 in the described manner at each of a plurality of locations equally circumferentially spaced about the periphery of the pattern wheel blank 48 as determined by the teeth 52 in the indexing gear 50.

Figures 3A, 3C:
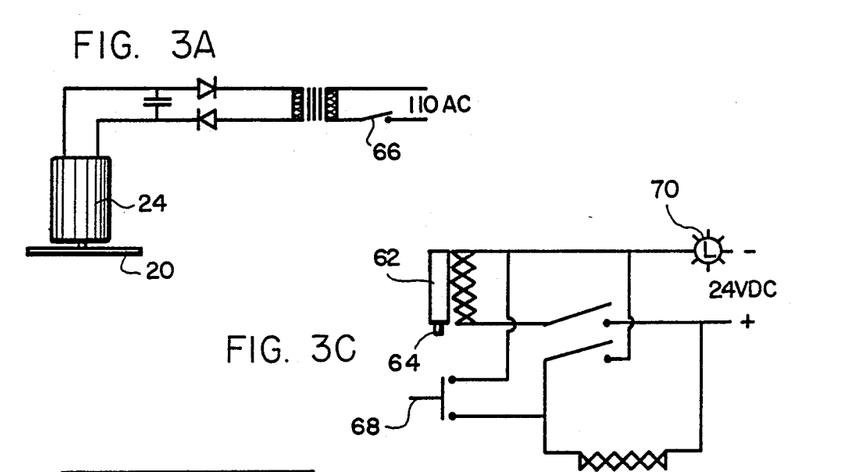
FIGS. 3A, 3B and 3C are schematic diagrams of individual electrical circuits in the electrical control circuitry of the pattern wheel cutting apparatus of FIG. 1.
Figure 3B:
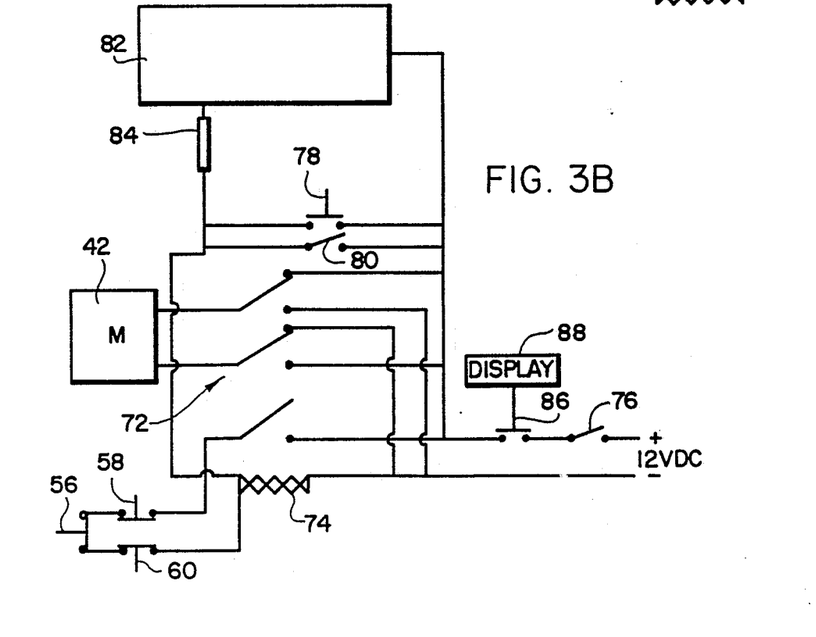

The control panel 12 and the operator work station 14 provide operational control of the cutting station 10. Electrical control circuitry for the cutting station 10 is housed within the control panel 12 and is schematically illustrated in FIGS. 3A, 3B, 3C. Basically, the control circuitry provides three independent circuits for respective operation of the drive motor 24 for the cutting wheel 20, as whown in FIG. 3A; of the drive motor 42 for the carriage 26, as shown in FIG. 3B; and of the solenoid 62 on the carriage 26, as shown in FIG. 3C.

Substantially any suitable conventional electric drive motor may be employed for driving rotational operation of the cutting wheel 20. In the presently preferred embodiment of the present apparatus, a direct-current electric drive motor is utilized and is supplied with operating electrical power from a conventional alternating current source through the conversion circuit of FIG. 3A. A manually operable switch is provided in the circuit of FIG. 3A for selectively energizing and deenergizing the drive motor 24 to actuate and deactuate rotation of the cutting wheel 20. Of course, as those persons skilled in the art will recognize, the particualr motor utilized for driving the cutting wheel 20 and the particular associated electrical supply circuitry is not critical and may be varied or modified as necessary or desirable.

As shown in FIG. 3C, the solenoid 62 is electrically connected with a suitable source of direct electrical current supplied through a relay-operated switch. A manually actuable switch 68 is provided in the solenoid circuit for selectively energizing the solenoid 62, and an indicator light 70 is provided in the circuit for illumination to indicate the energized condition of the solenoid.

As seen in FIG. 3B, the electric drive motor 42 for the carriage 26 is connected with a direct current electrical power supply through a reversible switching arrangement, indicated generally at 72, operated by a relay 74. The limit switches 56, 58, 60 are arranged in series intermediate the reversible switching arrangement 72 and the relay 74. The limit switch 86 is located in one power supply leg of the circuit of FIG. 3B and is connected with a numerical display 88 for sequential counting of the number of recipocations completed by the carriage 26, as also more fully explained hereinafter. A manually operable switch 76 is provided for enabling the circuit of FIG. 3B. Another manually operable switch 78 is provided for actuating individual reciprocations of the carriage 26 while a manually operable switch 80 is provided for actuating continuous reciprocation of the carriage 26, all as more fully explained hereinafter. In addition, the operator work station 14 is electrically connected in the carriage motor circuit of FIG. 3B for actuating individual reciprocations of the carriage 26. Specifically, the work station 14 includes a work plate 82 and a wand 84, each formed of an electrically conductive metal and connected in series in the electrical circuit of FIG. 3B for selective contact with and separation from one another to complete and break the circuit.

As best seen in FIG. 1, the manually actuable switches 66, 68, 76, 78 and 80, along with the display light 70 and the counter display 88, are mounted on the face of the control panel 12 for ready access by the operator.

The operation of the present pattern wheel cutting apparatus will thus be understood. Initially, a suitable uncut pattern wheel blank 48 and a suitable index gear 50 are selected and mounted to the shaft 46 on the carriage 26. As will be appreciated by those persons skilled in the art, the diameter of the pattern wheel blank 48 and the number of teeth 52 of the index gear 50 must be selected in relation to the knitting machine on which the pattern wheel to be produced will be installed and in relation to the particular fabric pattern to be knitted thereon. Specifically, the number of possible cutting locations available to be formed in the periphery of the pattern wheel blank 48 must correspond to the number of knitting neeles in the circular knitting maching over which the knitting pattern will repeat, which number must normally also be a whole number quotient or divisor of the total number of knitting needles in the knitting machine. At the same time, the spacing between successive cutting locations in the periphery of the pattern wheel blank 48 must correspond to the needle gauge of the knitting maching. Accordingly, the index gear 50 must be selected to have a total number of teeth 52 corresponding to the number of needles in the desired pattern repeat and the pattern wheel blank 48 must be selected to be of a circumference which, when divided by the number of needles in the desired pattern repeat, produces a quotient corresponding to the needle gauge of the knitting machine. Conventionally, a desired knitting pattern would initially be diagrammed or charted on pattern paper consisting of a plurality of squares, each representative of a knitted stitch in the finished fabric, perpendicularly arranged in vertical columns and horizontal rows representing, respectively, the number of knitting needles in the pattern repeat and the number of feeds of the knitting machine, each square being completed with a conventional knitting notation representing the action of each individual needle at each individual feed. As will be understood, a pattern wheel must be prepared for each feed of the knitting machine to control the necessary needle action thereat in relation to the needle action occurring a the other feeds of the maching, thereby to achieve the desired pattern. Accordingly, a pattern diagram prepared in this conventional fashion indicates the necessary arrangement of cuts to be formed in each pattern wheel for a given desired fabric pattern.

Once the desired fabric pattern has been charted and an appropriate pattern wheel blank 48 and index gear 50 have been installed on the carriage 26, the cutting operation to form peripheral teeth in the pattern wheel blank 48 is carried out. Initially, the switch 66 is closed to energize the drive motor 24 and actuate rotation of the cutting wheel 20 and the switch 76 is closed to enable the control circuits for the carriage drive motor 42. An operator then manually actuates successive reciprocations of the carriage 26 according to the prepared pattern diagram to form cuts in the periphery of the pattern wheel blank 48 at selected peripheral locations thereon and to leave the periphery of the pattern wheel blank 48 uncut at other peripheral locations thereon. Specifically, when a given peripheral locations on the pattern wheel blank 48 is to be left uncut, the operator initially closes the switch 68 in the control circuit for the solenoid 62, to energize the solenoid 62 to project its shaft 64 and, then, the operator initiates an individual reciprocation of the carriage 26 either by closing the switch 78 or by contacting the wand 84 to the work plate 82 to complete the carriage motor circuit. The carriage drive motor 42 is thereby energized to rotate the drive screw 34 to drive the carriage 26 leftwardly across the base 18 toward the rotating cutting wheel 20. However, in advance of engagement of the periphery of the pattern wheel blank 48 with the cutting wheel 20, the extended shaft 64 of the solenoid 62 contacts the limit switch 58 which acts through the relay 74 to reverse the switching arrangement 72 to operate the drive motor 42 and the drive screw 34 in the opposite direction to return the carriage 26 to its rightward starting position whereat the carriage 26 engages the limit switch 60 to deactuate the drive motor 42. Simultaneously, the carriage 26 engages the counter switch 86 to register completion of the carriage reciprocation at the counter display 88. At the completiom of the return movement of the carriage 26, the toothed periphery of the index gear 50 contacts the indexing lever 55 to incrementally advance the index 50 by one tooth and the pattern wheel blank 48 by a corresponding increment. On the other hands, when a cut is to be made in the periphery of the pattern wheel blank 48 at a given peripheral location, the operator opens the solenoid-actuating switch 68, if necessary, and initiates an individual reciprocation of the carriage 26 by closing the switch 78 or contacting the wand 84 to the work plate 82. Since the solenoid shaft 64 is withdrawn, the carriage 26 continues to move leftwardly to advance the periphery of the pattern wheel blank 48 into cutting engagement with the rotating cutting wheels 20 until the carriage 26 contacts the limit switch 56 to reverse the drive motor 42 to return the carriage 26 to its starting position whereat the carriage 26 contacts the limit switches 60, 86 to deactuate the drive motor 42 and register another complete carriagee reciprocation with the counter display 88 while, at the same time, the indexing lever 55 incrementally advances the index gear 50 and the pattern wheel blank 48.

For convenient reference by the operator, the light 70 on the control panel 12 is illuminated whenever the solenoid 62 is energized to aid in prevention of mistakes in the formation of the pattern wheel. Also, for convenience of the operator, the switch 80 may be utilized to actuate continuous reciprocation of the carriage 26 whenever a number of successive peripheral locations on the pattern wheel blank 48 are to be formed identically with cuts or left uncut, thereby avoiding the necessity that the operator must manually actuate each individual reciprocation of the carriage 26. The work plate 82 may be provided with a vertically movable linear retaining bar 90 by which the pattern diagram may be conveniently mounted to the work plate 82 and followed by the operator. Thus, by use of the wand 84, the operator can initiate individual reciprocations of the carriage 26 in rapid succession so as to complete the formation of a pattern wheel in a minimal amount of time. The sequential counter display 88 allows the operator to monitor the completion of all peripheral locations on the pattern wheel blank 48, which as will be understood may not be visually apparent when, for instance, the pattern calls for the initial peripheral location or locations on the pattern wheel blank to be left uncut. As an additional aid in this regard, the control panel 12 is preferably provided with a manually-settable numerical display 82 to display the total number of available peripheral locations about the pattern wheel blank 48 whereat cuts may be formed, which as will be understood is equivalent to the number of teeth in the indexing gear 50, to enable the operator to maintain a continuous comparison of the sequential counter display 88 with the display 92 to further assit the operator in recognizing the completion of any given pattern wheel.

As will thus be understood, the present pattern wheel cutting apparatus provides a simplified means of rapidly and inexpensively fabricating pattern wheels for use on textile circular knitting machines from ordinary plastic disks. The pattern wheels thereby formed require little more than a simple support bracket for mounting to the frame of a knitting machine, allowing pattern wheels prepared by the present apparatus to be retrofitted to substantially any conventional circular knitting machine including many such machine not originally intended for utilization of pattern wheel mechanisms. As a result, the present invention provides a ready means of significantly increasing the pattern capabilities of many, if not most, conventional circular knitting machines. Specifically, the present apparatus is capable of preparing pattern wheel in substantially any gauge and substantially any diameter and size of pattern repeat, subject of course to the structural and functional limitations of the particular knitting machine with which the pattern wheels are to be used.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. Apparatus for cutting peripheral teeth in a pattern wheel blank for use as a pattern wheel on a textile knitting machine or the like, said apparatus comprising a base, means for cutting the pattern wheel blank, means mounting the pattern wheel blank and said cutting means on said base for selective relative cutting movement of one of the pattern wheel blank and said cutting means toward and away from the other into and out of cutting engagement between the periphery of the pattern wheel blank and said cutting means and for selective relative indexing movement of one of the pattern wheel blank and said cutting means circumferentially about the axis of the pattern wheel blank for cutting engagement between the periphery of the pattern wheel blank and the cutting means at a plurality of locations about the periphery of the pattern wheel blank, and control means for selectively actuating and deactuating cutting movements of the movable one of the pattern wheel blank and said cutting means and for selectively varying the extent of movement thereof upon each cutting movement to selectively permit and prevent cutting engagement between the pattern wheel blank and said cutting means at each peripheral location on the pattern wheel blank, said control means including reversible drive means for the movable one of the pattern wheel blank and said cutting means, switch means actuable for initiating cutting movement thereof from a resting start position toward the other of the pattern wheel blank and said cutting means, selector means for predetermining the extent of movement of said movable one of the pattern wheel blank and said cutting means, and limit switch means for reversing the movement of said movable one of the pattern wheel blank and said cutting means at the predetermined extent of its cutting movement, for initiating opposite return movement thereof away from the other of the pattern wheel blank and said cutting means, and for stopping return movement of said one of the pattern wheel blank and said cutting means at said resting start position.

2. Pattern wheel cutting apparatus according to claim 1 and characterized further in that said mounting means comprises means mounting said cutting means fixedly to said base and means mounting the pattern wheel blank on said base for reciprocating movement toward and away from said cutting means.

3. Pattern wheel cutting apparatus according to claim 2 and characterized further in that said mounting means support the pattern wheel blank for rotational indexing movement.

4. Pattern wheel cutting apparatus according to claim 2 and characterized further in that said mounting means comprises a carriage reciprocably movable on said base toward and away from said cutting means, the pattern wheel blank being mountable on said carriage.

5. Pattern wheel cutting apparatus according to claim 3 and characterized further in that said mounting means comprises an indexing gear coaxial with the pattern wheel blank.

6. Apparatus for cutting peripheral teeth in a patter wheel blank for use on a textile knitting machine, said apparatus comprising a base, a driven cutting blade mounted in a fixed position relative to said base, a carriage mounted on said base for reciprocating movement toward and away from said cutting blade, means for supporting the pattern wheel blank on said carriage for movement thereby into and out of cutting engagement between the periphery of the pattern wheel blank and said cutting blade, means for rotatable indexing the pattern wheel blank incrementally for cutting engagement between the periphery of the pattern wheel blank and the cutting blade at a plurality of locations spaced about the periphery of the pattern wheel blank, and control means for selectively actuating and deactuating reciprocatinng movements of said carriage and for selectively varying the extent of movement of said carriage upon each reciprocation to selectively permit and prevent cutting engagement between the pattern wheel blank and the cutting blade at each peripheral location on the pattern wheel blank, said control means comprising reversible drive means for driving movement of said carriage, switch means actuable for initiating cutting movement of said carriage from a resting start position toward said cutting blade, selector means for predetermining the extent of cutting movement of said carriage and limit switch means for reversing movement of said carriage at the predetermined extent of its cutting movement, initiating opposite return movement of said carriage away from said cutting blade, and stopping return movement of said carriage at said resting start position.

7. Apparatus for cutting peripheral teeth in a pattern wheel blank for use on a textile machine, according to claim 6 and characterized further in that said indexing means comprises an indexing gear mounted to said carriage coaxial with the pattern wheel blank.

* * * * *

UNITED STATES PATENT AND TRADEMARK OFFICE
CERTIFICATE OF CORRECTION

PATENT NO. : 4,968,196

DATED : November 6, 1990

INVENTOR(S) : Jose Valls

It is certified that error appears in the above-identified patent and that said Letters Patent is hereby corrected as shown below:

Column 1, Line 19, reads " "cuts", " but should read -- "cuts," --.

Column 1, Line 27, reads "wheel" but should read -- wheels --.

Column 1, Line 36, after "usable" add -- only --.

Column 1, Line 48, reads "possible" but should read -- impossible --.

Column 1, Line 53, reads "wheel" but should read -- wheels --.

Column 2, Line 15, reads "ofthe" but should read -- of the --.

Column 2, Line 28, reads "extend" but should read -- extent --.

Column 2, Line 41, reads "extend" but should read -- extent --.

Column 4, Line 10, reads "periphery.  a" but should read -- periphery.  A --.

Column 4, Line 50, reads "whown" but should read -- shown --.

Column 4, Line 64, reads "particualr" but should read -- particular --.

Column 5, Line 52, reads "neeles" but should read -- needles --.

Column 5, Line 59, reads "maching" but should read -- machine --.

Column 6, Line 11, reads "a" but should read -- at --.

Column 6, Line 12, reads "maching" but should read -- machine --.

UNITED STATES PATENT AND TRADEMARK OFFICE
CERTIFICATE OF CORRECTION

PATENT NO. : 4,968,196

DATED : November 6, 1990

INVENTOR(S) : Jose Valls

It is certified that error appears in the above-identified patent and that said Letters Patent is hereby corrected as shown below:

Column 6, Line 24, reads "circuits" but should read -- circuit --.

Column 6, Line 31, reads "locations" but should read -- location --.

Column 6, Line 53, reads "completiom" but should read -- completion --.

Column 6, Line 58, reads "hands" but should read -- hand --.

Column 6, Line 67, reads "wheels" but should read -- wheel --.

Column 7, Line 4, reads "carriagee" but should read -- carriage --.

Column 7, Line 34, reads "82" but should read -- 92 --.

Column 7, Line 40, reads "assit" but should read -- assist --.

Column 7, Line 52, reads "machine" but should read -- machines --.

Column 7, Line 58, reads "wheel" but should read -- wheels --.

Column 8, Line 48, after "reversing" delete -- the --.

Column 8, Line 64, reads "support" but should read -- supports --.

Column 9, Line 7, reads "patter" but should read -- pattern --.

Column 9, Line 16, reads "rotatable" but should read -- rotatably --.

Column 9, Line 22, reads "reciprocatinng" but should read -- reciprocating --.

UNITED STATES PATENT AND TRADEMARK OFFICE
CERTIFICATE OF CORRECTION

PATENT NO. : 4,968,196

DATED : November 6, 1990

INVENTOR(S) : Jose Valls

Page 3 of 3

It is certified that error appears in the above-identified patent and that said Letters Patent is hereby corrected as shown below:

Column 10, Line 10, after "carriage" add -- , --.

Column 10, Line 18, after "textile" add -- knitting --.

Signed and Sealed this

Twenty-second Day of September, 1992

Attest:

DOUGLAS B. COMER

*Attesting Officer*      *Acting Commissioner of Patents and Trademarks*